United States Patent
Issler

(10) Patent No.: US 6,726,217 B1
(45) Date of Patent: Apr. 27, 2004

(54) PISTON RING FOR THE PISTON OF AN INTERNAL COMBUSTION ENGINE

(75) Inventor: Wolfgang Issler, Schwaikheim (DE)

(73) Assignee: Mahle GmbH, Stuttgart (DE)

( * ) Notice: Subject to any disclaimer, the term of this patent is extended or adjusted under 35 U.S.C. 154(b) by 0 days.

(21) Appl. No.: 09/868,079

(22) PCT Filed: Nov. 23, 1999

(86) PCT No.: PCT/DE99/03755

§ 371 (c)(1),
(2), (4) Date: Jun. 14, 2001

(87) PCT Pub. No.: WO00/36320

PCT Pub. Date: Jun. 22, 2000

(30) Foreign Application Priority Data

Dec. 14, 1998 (DE) .......................... 198 57 637

(51) Int. Cl.⁷ ................. F02F 5/00; F16J 9/12
(52) U.S. Cl. ........................ 277/460; 277/465
(58) Field of Search ............... 277/465, 442, 277/460

(56) References Cited

U.S. PATENT DOCUMENTS

| 384,272 | A | * | 6/1888 | Patten ................. 277/465 |
| 1,489,335 | A | * | 4/1924 | Seifert ................ 277/465 |
| 3,627,336 | A | * | 12/1971 | Lawson ............... 277/584 |
| 4,300,494 | A | * | 11/1981 | Graiff et al. ........ 123/193.5 |
| 4,359,229 | A | | 11/1982 | Cattaneo |
| 4,835,856 | A | | 6/1989 | Azami |
| 5,241,748 | A | | 9/1993 | Ishida |

FOREIGN PATENT DOCUMENTS

| DE | 36 34 708 | 4/1988 |
| DE | 39 34 795 | 10/1989 |
| DE | 42 05 503 | 8/1993 |
| DE | 197 20 779 | 5/1997 |
| JP | 05-340473 | 12/1993 |
| WO | WO97/11295 | 3/1997 |

\* cited by examiner

Primary Examiner—Anthony Knight
Assistant Examiner—Doug Hutton
(74) Attorney, Agent, or Firm—Collard & Roe, P.C.

(57) ABSTRACT

The aim of the invention is to prevent deposition of material on the piston ring flank (6) of a piston ring (3) for the piston (1) of an internal combustion engine. To this end, said piston ring is provided with channels (7) which are distributed on the circumference of said piston ring flank and which preferably are positioned radially thereon. Said channels are produced on the piston ring in a simple manner by using a laser.

3 Claims, 1 Drawing Sheet

PISTON RING FOR THE PISTON OF AN INTERNAL COMBUSTION ENGINE

CROSS REFERENCE TO RELATED APPLICATIONS

Figure 1:
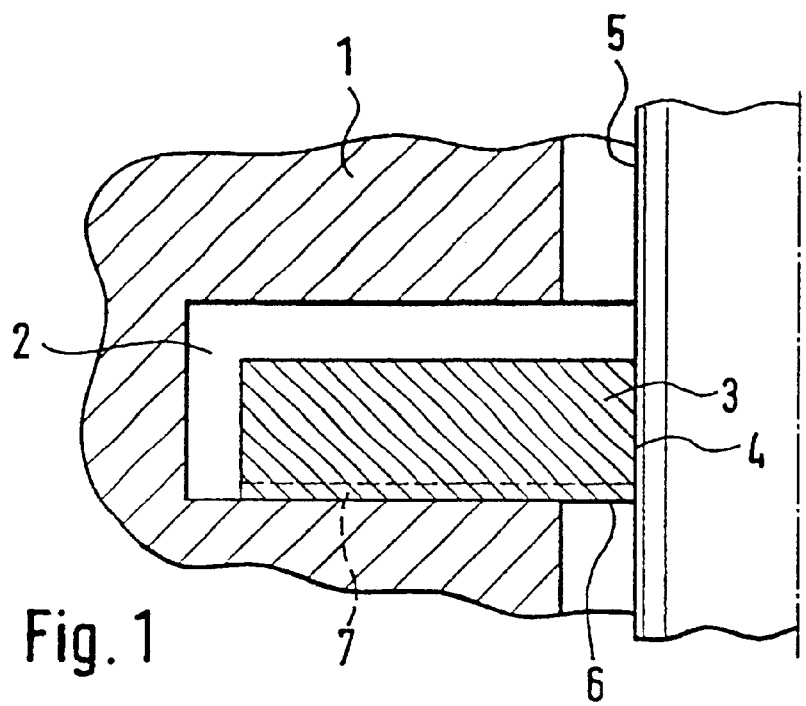

Applicant claims priority under 35 U.S.C. §119 of German Application No. 198 57 637.4 filed Dec. 14, 1998. Applicant also claims priority under 35 U.S.C. §120 of PCT/DE99/03755 filed Nov. 23, 1999. The international application under PCT article 21(2) was not published in English.

The invention relates to a piston ring, in particular to the compression ring for a piston for internal combustion engines, with the features according to the introductory part of claim 1.

Such a piston ring is known, for example from WO 97/11295 A1, in conjunction with which provision is made for radially extending channels that are distributed over the circumference for reducing the difference pressure acting on the compression ring in the lower flank of the piston ring. Such channels have a height of less than 1 mm, preferably of from 0.35 to 0.55 mm. Nothing is stated in said document as to how said channels, which are relatively deep, are produced.

Furthermore, a piston for internal combustion engines is known from DE 42 05 503 A1, where provision is made for a defined type of profiling extending all around the circumference of a compression ring for the purpose of avoiding damage to the flank of an annular groove.

The drawback with said design is the fact that producing such a phonograph record-like profiling in the flank of the annular groove is difficult and requires much expenditure.

Based on the type of prior art specified above and the problem posed when plating of the flank of a piston ring with a material is to be avoided, in particular of the uppermost compression ring, the problem of the invention is to find a means that leads to a corresponding piston ring in a simple manner and at favorable cost.

Said problem is solved with a piston ring with the features according to the characterizing part of claim 1.

Further advantageous developments of the invention are contained in the dependent claims.

Figure 2:
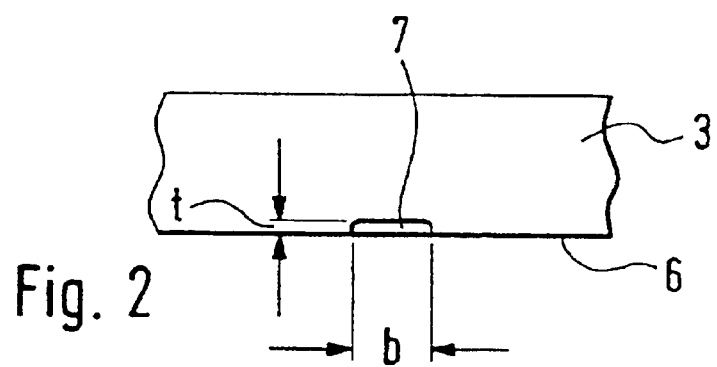

The invention is explained in greater detail in the following with the help of an exemplified embodiment shown in the drawing, in which:

FIG. 1 shows a sectional side view of a piston ring as defined by the invention; and FIG. 2 shows a side view of a cutout of the piston ring.

In a piston 1 for, for example an Otto motor made of a light metal alloy, a piston ring 3 (compression ring) is supported in an annular groove 2. Said piston ring rests against the cylinder wall 5 with its running surface 4. The approximately radially extending channels 7 are worked into the lower flank 6 and are uniformly distributed over the circumference. Said channels 7 have a typical depth "t" of, for example 1 to 5 $\mu$m (shown in the drawing in a highly exaggerated way), and a width "b" of 2 mm. The channels 7 are worked into the piston ring 3 in a simple manner and at favorable cost using a laser method, which per se is known. Any bulges that might locally occur in said process next to the channels have no disadvantageous effects.

It has been found that a means was discovered with said features in a simple manner that avoids damage to the groove flank or to material plated to the piston ring.

What is claimed is:

1. A piston ring, in particular a compression ring for a piston for internal combustion engines, comprising 10 to 100 channels formed via a laser method and distributed over a circumference of a lower flank of the piston ring, wherein said channels are disposed with regular spacings and extend radially, and wherein said channels have a depth "t" of 0.5 to 15 $\mu$m, and a width "b" of 0.05 to 5 mm;

such that said channels avoid damage to a groove of the piston supporting the piston ring and prevent material from being plated-to the piston ring.

2. The piston ring according to claim 1, wherein said flank of the piston ring having said channels has an additional sulfur surface coating.

3. The piston ring according to claim 1, wherein the piston ring is supported in a piston having a first annular groove with a groove height of 0.8 to 1.8 mm, a top land height of 2 to 10 mm, a ring land height of 2.5 to 7 mm, as well as a flank roughness of Ra<0.3 micron.

* * * * *